United States Patent
Rostaing et al.

(10) Patent No.: US 10,380,415 B2
(45) Date of Patent: Aug. 13, 2019

(54) METHOD FOR DETERMINING A COLOUR VALUE OF AN OBJECT IN AN IMAGE

(71) Applicant: SAFRAN IDENTITY & SECURITY, Issy les Moulineaux (FR)

(72) Inventors: Laurent Rostaing, Issy les Moulineaux (FR); Alain Rouh, Issy les Moulineaux (FR); Jean Beaudet, Issy les Moulineaux (FR)

(73) Assignee: SAFRAN IDENTITY & SECURITY, Issy les Moulineaux (FR)

( * ) Notice: Subject to any disclaimer, the term of this patent is extended or adjusted under 35 U.S.C. 154(b) by 0 days.

(21) Appl. No.: 15/426,710

(22) Filed: Feb. 7, 2017

(65) Prior Publication Data
US 2017/0236005 A1    Aug. 17, 2017

(30) Foreign Application Priority Data
Feb. 12, 2016 (FR) ..................... 16 51157

(51) Int. Cl.
*G06K 9/00* (2006.01)
*G06K 9/40* (2006.01)
(Continued)

(52) U.S. Cl.
CPC ..... *G06K 9/00449* (2013.01); *G06K 9/00463* (2013.01); *G06K 9/40* (2013.01);
(Continued)

(58) Field of Classification Search
CPC .. G06K 9/00449; G06K 9/00463; G06T 7/90; G06T 7/68; G06T 7/75
See application file for complete search history.

(56) References Cited

U.S. PATENT DOCUMENTS

| 5,140,139 A | 8/1992 | Shepard |
| 2001/0033688 A1 | 10/2001 | Taylor |

(Continued)

FOREIGN PATENT DOCUMENTS

| FR | 1459742 A | 6/1966 |
| FR | 2952218 A1 | 5/2011 |
| WO | 2009/137073 A1 | 11/2009 |

OTHER PUBLICATIONS

Oct. 31, 2016 Search Report issued in French Patent Application No. 1651157.

(Continued)

*Primary Examiner* — Ruiping Li
(74) *Attorney, Agent, or Firm* — Oliff PLC; R. Brian Drozd

(57) ABSTRACT

A method for determining an apparent color value of pixels corresponding to a subpart of an object in the acquired image, including: estimating a geometric distortion model of the object in the acquired image compared with a reference model of the object; determining a position in the acquired image of the subpart and determining a zone of the acquired image, referred to as the reference zone, situated in a predetermined vicinity of the subpart, each pixel of the reference zone resulting from a projection in the acquired image of a zone of the reference model, referred to as a blank zone, the blank zone being associated with a predetermined color value in the reference model, the projection using the geometric distortion model; and determining an apparent color value of the pixels of the subpart, from a color value of at least one pixel of the reference zone.

20 Claims, 4 Drawing Sheets

(51) Int. Cl.
    *G06K 9/46*          (2006.01)
    *G06T 7/68*          (2017.01)
    *G06T 7/73*          (2017.01)
    *G06T 7/90*          (2017.01)
    *G06K 9/36*          (2006.01)

(52) U.S. Cl.
    CPC .............. *G06K 9/4652* (2013.01); *G06T 7/68* (2017.01); *G06T 7/75* (2017.01); *G06T 7/90* (2017.01); *G06K 2009/363* (2013.01); *G06T 2207/10024* (2013.01); *G06T 2207/30176* (2013.01)

(56) References Cited

U.S. PATENT DOCUMENTS

2008/0311551 A1   12/2008  Reed
2015/0379339 A1*  12/2015  Kuznetsov ......... G06K 9/00456
                                                    382/203

OTHER PUBLICATIONS

Hewlett-Packard Company et al; "Mobile document scanning and copying;" Research Disclosure; Mason Publications; Hampshire, GB; vol. 568; No. 17; Aug. 1, 2011; XP007140747.
Faridul et al; "A Survey of Color Mapping and its Applications;" EUROGRAPHICS 2014; Jan. 1, 2014; 26 pp.; XP055194560.

* cited by examiner

METHOD FOR DETERMINING A COLOUR VALUE OF AN OBJECT IN AN IMAGE

The invention relates to a method for determining an apparent colour value of pixels corresponding to a subpart of an object represented in an image, a method allowing determining that a mark has been applied to a subpart of a document and a method for correcting an image of a document using the determination method and a device implementing one of said methods.

It is usual to have to tick boxes in a document, for example to respond to a multiple-choice questionnaire or to fill in a lottery ticket. In order to accelerate a procedure for processing the document, the document is in general digitized in the form of an image by an image acquisition system and the image of the digitized document is analysed in order to determine on which boxes a mark has been applied. It should be noted that an image is a grid of pixels, each pixel being associated with an item of position information in the image (i.e. coordinates of the pixel in the image) and with a colour value. The colour value of a pixel is represented by a vector of components that may comprise a number greater than or equal to one of components. Each vector of components is given in a colorimetric space, such as the RGB, YUV or YCbCr space. Other colorimetric spaces do however exist.

Methods have thus been proposed for detecting and identifying, in an image representing the document, a position and a content of subparts of a document, such as boxes or zones comprising one or more characters, on which a mark can be applied. Many of these methods, such as those disclosed by the U.S. Pat. No. 5,140,139 or the patent application US 2008/0311551, use OCR (optical character recognition) or OMR (optical mark recognition) techniques in order to find the position of a box in the image of the digitized document from a known document model and to determine the content of the box.

Such methods are capable of taking into account some uncertainties in a positioning of the document when it is digitized compared with the known document model, such as a rotation or an enlargement. These methods are, on the other hand, sensitive to possible geometric distortions of the document, due for example to folding or creasing of the document and/or to a perspective snapshot of the document. Such geometric distortions are in fact liable to vary relative positions of the boxes to be detected with respect to one another.

Systems have then been proposed comprising means for mechanically smoothing a document before it is digitized. Such systems are effective but are generally complex and bulky and substantially increase the cost of the image acquisition system.

Other methods, such as the one described in the patent FR 2952218, propose to smooth a digitized document by software and hardware method, in order to determine a virtual image of the deformed document. It is then easy to find the subparts of the document, such as the boxes, to which a mark can be applied using the virtual image.

The patent application FR 1459742 proposes a method for identifying subparts of a document to which a mark can be applied, the document being liable to be deformed. Said method comprises a digitization of the document in image form, identification of candidate subparts in the image of the document and calculation of a signature for each of the candidate subparts. The identification of the subparts of the document to which a mark can be applied comprises conjointly a comparison of the calculated signatures with reference signatures, said comparison being carried out using a geometric distortion model of the document and an estimation, according to said comparison, of said geometric distortion model.

However, geometric distortions are not the only distortions that a document may suffer. Other types of distortion, referred to as colorimetric distortions, may modify the visual appearance of a document in the image of the digitised document. Thus variations in brightness when an image of the digitized document is acquired, or defects in an image acquisition device included in the image acquisition system, may cause divergences between actual colours of the document and apparent colours of the document in the image of the digitized document. For example, a box in a first colour in the document may appear in a second colour, different from the first colour, in the image of the digitized document.

It is known that many methods for determining whether a mark has been applied to a subpart, such as a box to be ticked in a document, rely on analysis of the colours in the box. It will therefore be understood easily that, if the apparent colour in the box in the image of the digitized document does not correspond to an expected colour, for example the real colour of the box in the document, then it becomes difficult to make a reliable decision as to whether a mark has been applied to the box.

It is desirable to overcome these drawbacks of the prior art.

It is in particular desirable to propose a method and a device for determining an apparent colour of pixels in an image corresponding to a subpart of a document (such as a box) to which a mark can be applied (i.e. a subpart of the document intended to receive a mark) when this document has undergone a geometric distortion and a colorimetric distortion. This method can, for example, be used to improve a method for detecting ticked boxes, for example, by reducing the number of errors in detecting ticked boxes.

According to a first aspect of the invention, the invention relates to a method for determining an apparent colour value of pixels corresponding to a subpart of an object represented in an image, referred to as the acquired image. The method comprising: estimating a geometric distortion model of said object in the acquired image compared with a reference model of the object; from the geometric distortion model and the reference model of the object, determining a position in the acquired image of the subpart and determining a zone of the acquired image, referred to as the reference zone, situated in a predetermined vicinity of the subpart, each pixel of the reference zone resulting from a projection in the acquired image of a zone of the reference model of the object, referred to as a blank zone, the blank zone being associated with a predetermined colour value in the reference model of the object, the projection using the geometric distortion model; and determining an apparent colour value of the pixels of the subpart, from a colour value of at least one pixel of the reference zone.

Thus, even if the object appears in the acquired image with a geometric distortion and a colorimetric distortion, it is possible to determine the colour, i.e. the apparent colour value, that the subpart in the acquired image should have, if no mark has been applied to the subpart. Knowing what colour a subpart in the acquired image should be, it is possible to detect with more reliability whether a mark has been applied to this subpart and/or to correct the colour of said subpart.

According to a second aspect of the invention, the invention relates to a method for determining that a mark has been applied to a subpart of a document, said document comprising at least one subpart on which a mark can be applied, an image representing the document, referred to as the acquired image, having been acquired by an image acquisition device. The method comprises the following steps: for each subpart of the document on which a mark can be applied, determining an apparent colour value of the pixels of acquired image corresponding to the subpart by applying the method according to the first aspect to the subpart, the object being the document; and deciding, for each subpart of the document on which a mark can be applied, that a mark has been applied on said subpart when a proportion of the pixels corresponding to the subpart having a colour value, referred to as the pixel colour value, close to the apparent colour value, is below a first predetermined threshold, a pixel colour value being close to the apparent colour value when a difference between said pixel colour value and the apparent colour value is less than a predetermined difference.

In this way, the detection of subparts comprising a mark is made more reliable by virtue of the method according to the first aspect.

In one embodiment, the method further comprises applying a correction to the pixels of the acquired image corresponding to each subpart of the document on which a mark can be applied according to the apparent colour value obtained for said subpart, each pixel on which a correction is applied becoming a corrected pixel, each pixel taken into account for determining whether the proportion of pixels corresponding to the subpart having a pixel colour value close to the apparent colour value is below the first predetermined threshold being a corrected pixel.

In one embodiment, the correction applied to the pixels of the acquired image corresponding to a subpart of the document on which a mark can be applied comprises applying a different normalization factor to each component of each of said pixels, each weighting factor being calculated from the apparent colour value associated with said subpart.

In one embodiment, the method further comprises filtering, among the apparent colour values determined for each subpart of the document on which a mark can be applied, aberrant colour values, an apparent colour value of a first subpart of a document being considered to be aberrant when a difference between the apparent colour value and a colour value, referred to as the vicinity colour value, representing apparent colour values of second subparts, adjacent to the first subpart, is above a second predetermined threshold, a second subpart being adjacent to a first subpart when a distance between the first subpart and the second subpart is less than a predetermined distance, the apparent colour value associated with a subpart being replaced by the vicinity colour value when the apparent value is an aberrant colour value.

In one embodiment, each subpart of the document is a box delimited by a contour and the method further comprises, for each box on the document: determining, from the distortion model and the reference model of the document, a position of each pixel corresponding to the contour of the box; determining a colour value, referred as the contour colour value, representing colour values of pixels of said contour; and correcting the colour value of each pixel of said contour and/or of each pixel situated inside said contour using the contour colour value and a contour pixel colour value given by the reference model of the document.

In one embodiment, when a pixel of said contour or a pixel situated inside said contour is corrected, the pixel is transformed so as to represent it in a colorimetric space in which each pixel is associated with components comprising a hue component, the correction consisting of modifying the hue component using a hue component issuing from the contour colour value and a hue component issuing from the contour pixel colour value given by the reference model of the document.

According to a third aspect of the invention, the invention relates to a method for correcting an image, referred to as the acquired image, of a document, said document comprising at least one subpart on which a mark can be applied. The method comprises the following steps: for each subpart of the document on which a mark can be applied, determining an apparent colour value of the pixels of the acquired image corresponding to the subpart by applying the method according to the first aspect to the subpart, the object being the document; and applying a correction to the pixels of the acquired image corresponding to each subpart of the document according to the apparent colour value obtained for said subpart.

Thus it is possible to apply a correction to the colour of a subpart of the document taking into account the geometric and colorimetric distortions undergone by the document.

In one embodiment, the correction applied to the pixels of the acquired image corresponding to a subpart of the document comprises applying a different normalisation factor to each component of each of said pixels, each weighting factor being calculated from the apparent colour value associated with said subpart.

In one embodiment, the method further comprises filtering, among the apparent colour values determined for each subpart of the document on which a mark can be applied, aberrant colour values, an apparent colour value of a first subpart being considered to be aberrant when a difference between the apparent colour value and a colour value, referred to as the vicinity colour value, representing apparent colour values of second subparts adjacent to the first subpart, is above a predetermined threshold, a second subpart being adjacent to a first subpart when a distance between the first subpart and the second subpart is less than a predetermined distance, the apparent colour value associated with a subpart being replaced by the vicinity colour value when the apparent colour value is an aberrant colour value.

In one embodiment, each subpart of the document is a box delimited by a contour and the method further comprises, for each box on the document: determining, from the distortion model and the reference model of the document, a position of each pixel corresponding to the contour of the box; determining a colour value, referred to as the contour colour value, representing colour values of pixels of said contour; and correcting the colour value of each pixel of said contour and/or of each pixel situated inside said contour using the contour colour value and a contour pixel colour value given by the reference model of the document.

In one embodiment, when a pixel of said contour or a pixel situated inside said contour is corrected, the pixel is transformed so as to represent it in a colorimetric space in which each pixel is associated with components comprising a hue component, the correction consisting of modifying the hue component using a hue component issuing from the contour colour value and a hue component issuing from the contour pixel colour value given by the reference model of the document.

According to a fourth aspect of the invention, the invention relates to a device comprising means for implementing the method according to the first aspect or according to the second aspect or according to the third aspect.

According to a fifth aspect of the invention, the invention relates to an image acquisition system comprising a device according to the fourth aspect.

According to a sixth aspect of the invention, the invention relates to a computer program containing instructions for the implementation, by a device, of the method according to the first aspect or the method according to the second aspect or the method according the third aspect, when said program is executed by a processor of said device.

According to a seventh aspect of the invention, the invention relates to storage means storing a computer program containing instructions for the implementation, by a device, of the method according to the first aspect or the method according to the second aspect or the method according the third aspect, when said program is executed by a processor of said device.

The features of the invention mentioned above, as well as others, will emerge more clearly from a reading of the following description of an example embodiment, said description being given in relation to the accompanying drawings, among which:

The invention is described hereinafter in a context of digitized documents in two dimensions resulting from a digitization of a two-dimensional or three-dimensional document. Depending on the distortions that it has undergone, a document before digitization thereof may be in two dimensions or three dimensions. The document may for example be a sheet of paper containing boxes to be ticked. The invention may however apply to any sort of object. The invention may for example apply to a digitized three-dimensional object resulting from a digitization of a three-dimensional object comprising subparts on which marks can be applied. The digitization of said object may, for example, have caused geometric and colorimetric distortions.

Moreover, we describe an implementation of the invention by a system also making an acquisition of an image of the document to be digitized. The invention also applies in the case where the system or device implementing the invention obtains an image of a document from an image acquisition system or device independent of the device or system implementing the invention.

Figure 1:
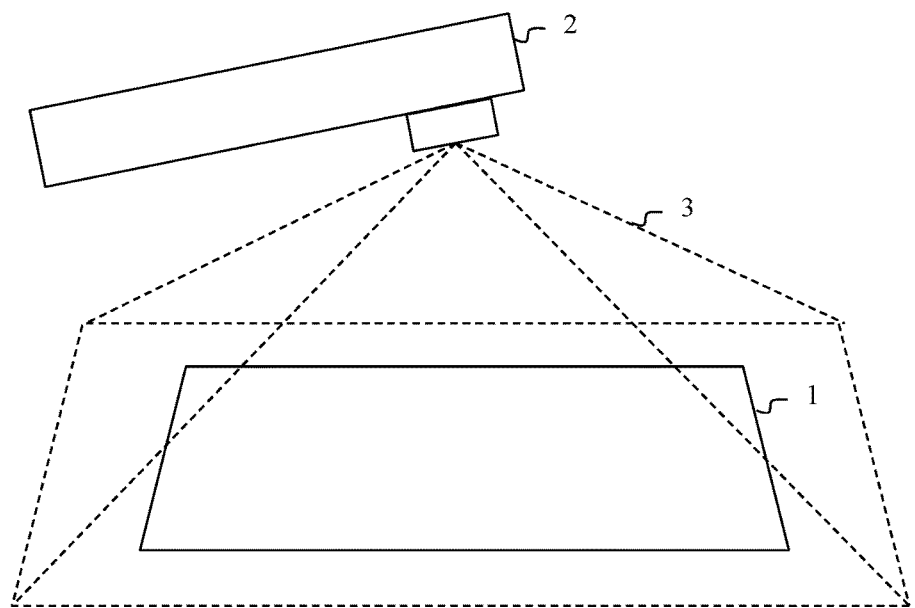
FIG. 1 illustrates schematically an example of a document in the course of digitization.

FIG. 1 illustrates schematically an example of a document in the course of digitization.

The document 1 in the course of digitization is for example a rectangular sheet of paper comprising subparts, such as boxes, on which marks can be applied, such as a cross, a dot or a line.

The document 1 is digitized by a system 2 serving, in the context of the invention, as an image acquisition system. In the example in FIG. 1 the image acquisition system 2 is for example a smartphone, a tablet or a digital camera. The document is seen by the image acquisition system according to any optical field 3. The image acquisition system makes an acquisition of an image of the document 1. In the example in FIG. 1, the optical field 3 according to which the image acquisition system sees the document means that the document is seen in perspective, which, in the image of the document thus digitized, referred to as the acquired image, causes a distortion of the document.

In one embodiment, the document is a lottery ticket containing boxes to be ticked.

In one embodiment, the image acquisition system 2 is a system dedicated to the digitization of lottery tickets through which a user passes the lottery ticket in a specific manner. In one embodiment, the dedicated system comprises for example a document scanner.

Figure 2:
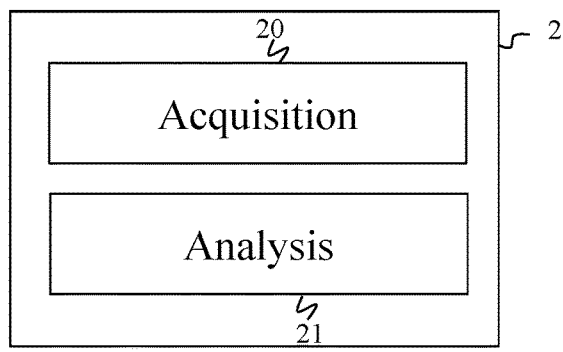
FIG. 2 illustrates schematically an example of an image acquisition and analysis system.

FIG. 2 illustrates schematically an example of an image acquisition system.

The image acquisition system comprises an image acquisition device 20 comprising an optical system and an image sensor such as a CCD (charge-coupled device) sensor or CMOS (complementary metal oxide semiconductor) sensor and an analysis module 21 able to implement the methods according to the invention.

Figure 3:
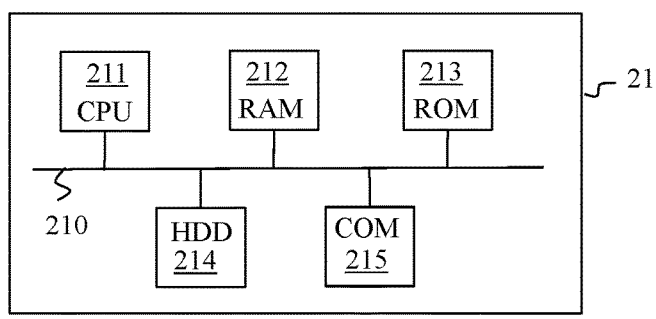
FIG. 3 illustrates schematically an example of hardware architecture of an analysis module included in the image acquisition system.

FIG. 3 illustrates schematically an example of hardware architecture of the analysis module 21 included in the image acquisition system 2.

According to the example of hardware architecture shown in FIG. 3, the analysis module 21 then comprises, connected by a communication bus 210: a processor or CPU (central processing unit) 211; a random access memory (RAM) 212; a read only memory (ROM) 213; a storage unit such as a hard disk or a storage medium reader, such as an SD (secure digital) reader 214; at least one communication interface 215 enabling the analysis module 21 to communicate with the image acquisition device 20.

The processor 211 is capable of executing instructions loaded into the RAM 212 from the ROM 213, from an external memory (not shown), from a storage medium (such as an SD card) or from a communication network. When the analysis module 21 is powered up, the processor 211 is capable of reading instructions from the RAM 212 and executing them. These instructions form a computer program causing the implementation, by the processor 211, of all or some of the methods described below in relation to FIGS. 5, 6 and 7.

The methods described below in relation to FIGS. 5, 6 and 7 may be implemented in software form by the execution of a set of instructions by a programmable machine, for example a DSP (digital signal processor), a microcontroller or a GPU (graphics processing unit), or be implemented in hardware form by a machine or a dedicated component, for example an FPGA (field-programmable gate array) or an ASIC (application-specific integrated circuit).

Figure 5:
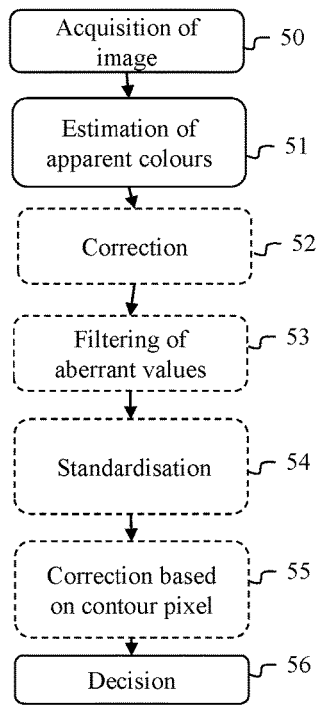
FIG. 5 illustrates schematically a method for determining that a mark has been applied to at least one subpart of a document.

FIG. 5 illustrates schematically a method for determining that a mark has been applied on at least one subpart of a document.

In a step 50, the image acquisition system 2 makes an acquisition of an image of the document 1 by means of its image acquisition device 20.

Figure 4A:
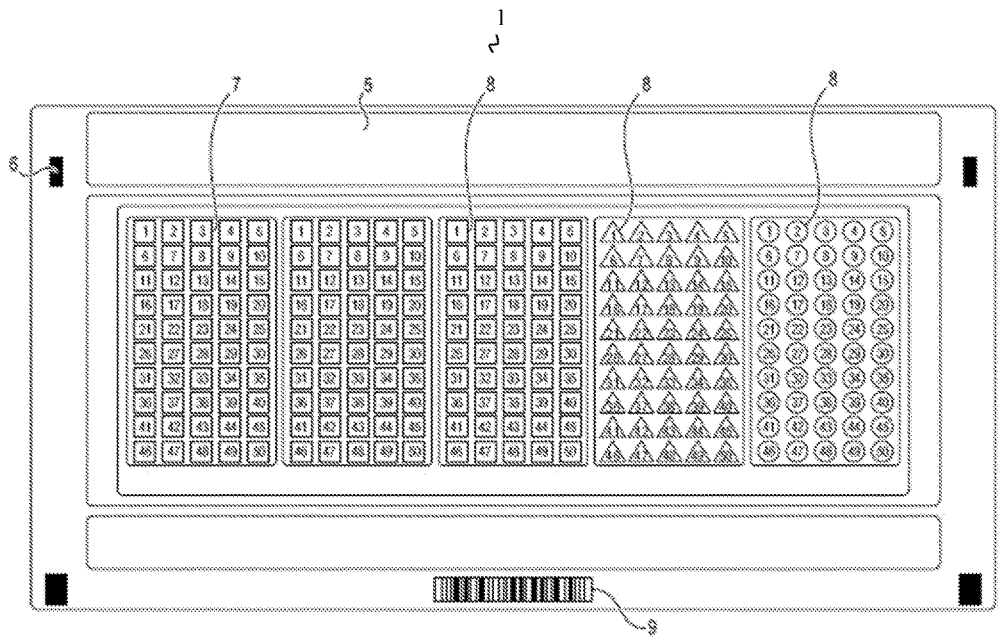
FIG. 4A illustrates schematically an example of a reference model of a document.

FIG. 4A illustrates schematically an example of a reference model of the document D1.

The reference model is for example an image of the document D1 that has not undergone any geometric distortion or any colorimetric distortion. In the example in FIG. 4A, the document 1 is a lottery ticket. Such a ticket may comprise decorative elements 5, positioning pads 6, grids 7 comprising boxes 8, and a code 9 (here a barcode) for recognising the document type. Box means a subpart having any closed or non-closed contour, or a subpart of any shape having a background colour different from a background colour of the lottery ticket, but without any delimitation line. A box delimits a space intended to be filled in by a user (i.e. a space on which a mark can be applied by a user or intended to receive a mark of a user). Such a contour may be located by a line having a colour different from a colour of the inside of the box. In the example illustrated in FIG. 4A, some boxes have a square closed contour and other boxes have a star-shaped closed contour. Boxes may also have a content such as a numeral as indicated in FIG. 4A.

In one embodiment, the subparts are delimited not by a contour but by a predetermined vicinity around one (or more) character(s) on which it is possible to apply a mark. The predetermined vicinity is for example a circle centred on said character with a predetermined radius, for example equal to 1 cm.

In one embodiment, the colour value inside each subpart of the document 1 is identical and equal to a first predetermined colour value.

In one embodiment, the colour value of the inside of at least one subset of subparts of the document 1 is identical and equal to a first predetermined colour value.

Figure 4B:
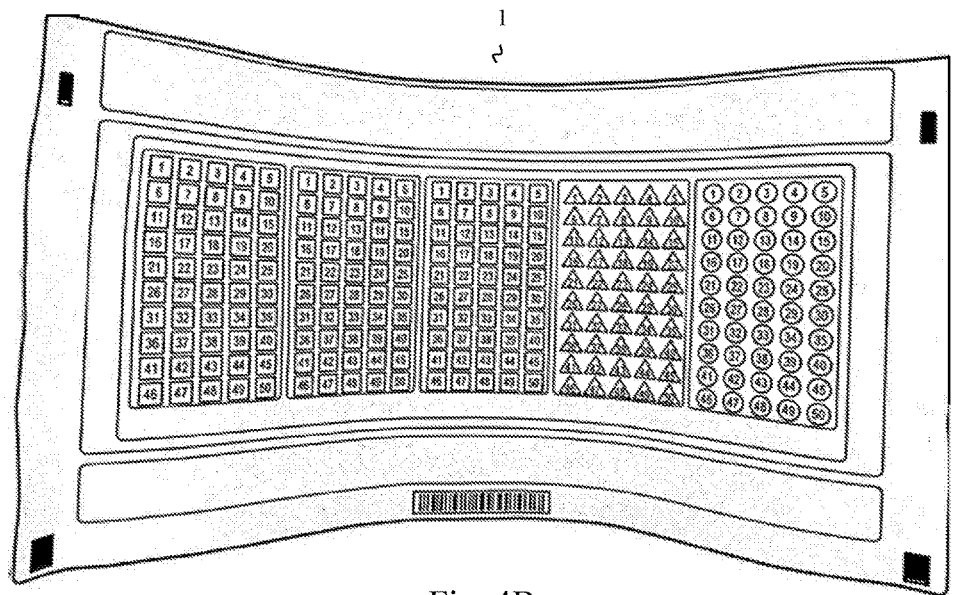
FIG. 4B illustrates schematically an example of a document, corresponding to the reference model, that has undergone a first geometric distortion.

FIG. 4B illustrates schematically an example of a document 1, corresponding to the reference model in FIG. 4A, that has undergone a first geometric distortion.

In the example in FIG. 4B, the document D1 has been coiled up and was not completely uncoiled when the acquired image was acquired. In this example, the document D1, which was originally a two-dimensional document, is now a three-dimensional document.

Figure 4C:
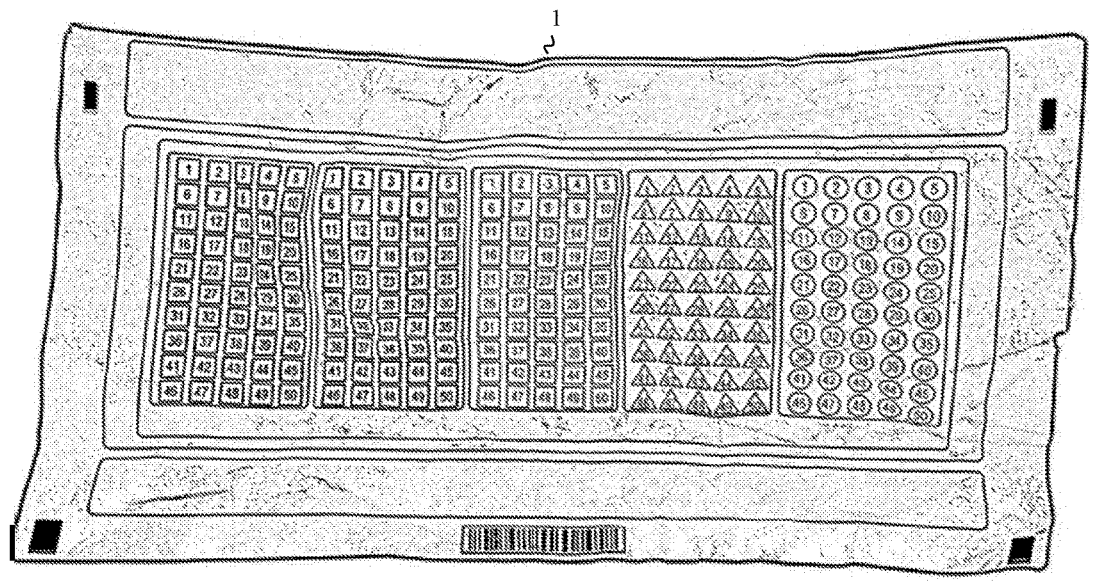
FIG. 4C illustrates schematically an example of a document, corresponding to the reference model, that has undergone a second geometric distortion.

FIG. 4C illustrates schematically an example document 1, corresponding to the reference model in FIG. 4A, that has undergone a second geometric distortion.

In the example in FIG. 4C, the document 1 has been creased and was not smoothed when the acquired image was acquired. There also, the document 1, which was originally a two-dimensional document, is now a three-dimensional document.

In the two examples of a document 1 that has undergone a distortion described in relation to FIGS. 4B and 4C, colorimetric distortions caused by inequalities of illumination of the document during its digitization are added to each geometric distortion. These colorimetric distortions may be global and have affected the entire document 1 in the same way when it was digitized, or local and have affected the document 1 unequally when it was digitized.

By virtue of the reference model of the document 1, the original colour value of each pixel of the reference model of the document 1 (i.e. the actual colour value of the pixel in the document 1) is known. More particularly, the colour value of each pixel of a subpart of the document 1 is known and equal to the first predetermined colour value. However, following the geometric distortions and the colorimetric distortions undergone by the document 1, each pixel of the subpart may appear in the acquired image with a colour value, referred to as the apparent colour value, different from the first predetermined colour value. The apparent colour value is the colour value of a subpart as it appears in the acquired image of the document 1 when no mark has been applied to said subpart. It is then advantageous to be able to determine, for each subpart of the document 1 on which a mark can be applied, which is the apparent colour value corresponding to the first predetermined colour value. Knowledge of the apparent colour value of a subpart of the document 1 may be used for example to decide reliably whether a mark has been applied to the subpart or not, or to make a correction to the pixels corresponding to a subpart in the image of the document 1.

Figure 6:
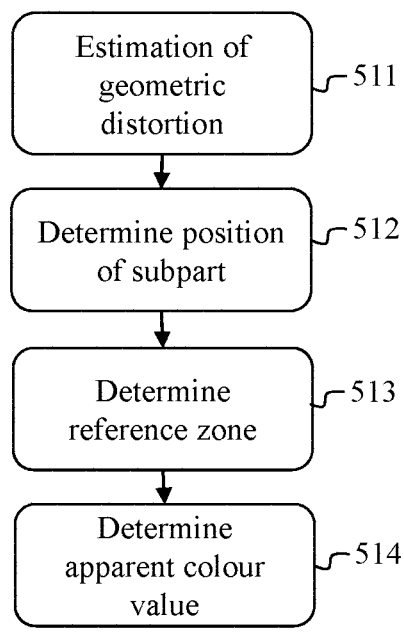
FIG. 6 illustrates schematically a method for determining an apparent colour value of pixels corresponding to a subpart of an object on which a mark can be applied, the object being represented in an image.

Returning to FIG. 5, in a step 51, for each subpart of the document 1 on which a mark may be applied, the analysis module 21 determines an apparent colour value of the pixels of the acquired image corresponding to the subpart by applying to said subpart a method described in relation to FIG. 6.

In a step 56, the analysis module 21 decides, for each subpart of the document 1 on which a mark may be applied, that a mark has been applied on said subpart when a proportion of pixels corresponding to the subpart having a colour value, referred to as the pixel colour value, close to the apparent colour value, is below a predetermined threshold, a pixel colour value being close to the apparent colour value when a difference between the pixel colour value and the apparent colour value is less than a predetermined difference. For example, when the proportion of pixels corresponding to the subpart having a colour value close to the apparent colour value is below 50%, the analysis module 21 decides that a mark has been applied to the subpart. For pixels represented by a component vector, the difference between two colour values is represented for example by the norm $L^2$ of the difference between each component of the same type of each of the two colour values.

In one embodiment, the method described in relation to FIG. 5 comprises an intermediate step 53, between step 51 and step 56. An objective of step 53 is to filter, among the apparent colour values determined for the subparts of the document D1 during step 51, aberrant colour values. It is known, by virtue of the reference model of the document 1, that the colour value associated with each subpart of the document 1 is equal to the first predetermined colour value. Consequently, even in the case of geometric or colorimetric distortion, it is improbable that the apparent colour values determined for each subpart during step 51 will be very different from one another since they are all derived from the first predetermined colour value, particularly when the apparent colour values are associated with spatially close subparts.

An apparent colour value of a first subpart is considered to be aberrant when it is very different from a colour value representing apparent colour values of second subparts adjacent to the first subpart. A first colour value is very different from a second colour value when a difference between the first and second colour values is above a predetermined threshold. When two colour values the difference of which it is wished to calculate are each represented by a vector of K (K>1) components, a value representing a difference is calculated in the form of a distance between the two colour values in a space with K dimensions, where each dimension represents a component. For example, when the colour values are given in the RGB colorimetric space, the distance is calculated in a three-dimensional space. It should be noted that here a second subpart is a subpart of the document 1 different from the first subpart. A second subpart is adjacent to a first subpart when it is situated at a distance less than a predetermined distance from the first subpart. The predetermined distance may be adjusted so as to take into account only second subparts spatially close to the first subpart (for example the four second subparts closest to the first subpart) or all the subparts of the document 1. Taking into account spatially close second subparts makes it possible to take into account local specificities of the geometric and colorimetric distortions.

In one embodiment, during step 53, the analysis module 21 determines an average (or respectively median) colour value by calculating an average (or respectively by determining a median value) of the apparent colour values of the second subparts of the document 1 situated at the predetermined distance from the first subpart.

When a difference between the apparent colour value of the first subpart and the average (or respectively median) colour value is above a predetermined threshold, the analysis module 21 decides that the apparent colour value is aberrant and replaces it with the average (or respectively median) colour value.

In one embodiment, during step 53, the analysis module 21 determines a geometric model connecting a position of a pixel in the acquired image to an apparent colour value of said pixel. The apparent colour value in the acquired image corresponds to the first predetermined colour value in the reference model of the document. The geometric model is for example an affine model:

$$\begin{pmatrix} R \\ G \\ B \end{pmatrix} = M \cdot \begin{pmatrix} x \\ y \\ 1 \end{pmatrix}$$

where R, G and B are three components representing a colour value of a pixel situated at a given position by coordinates x and y in the acquired image and M is a 3×3 affine matrix:

$$M = \begin{pmatrix} M_{11} & M_{21} & M_{31} \\ M_{12} & M_{22} & M_{32} \\ M_{13} & M_{23} & M_{33} \end{pmatrix}$$

The $M_{ij}$s are coefficients of the affine matrix M.

It is assumed here that the acquired image is an image using the RGB colorimetric space. In this case, the colour value of each pixel of the acquired image is represented by three components, a first component denoted R represents a red component, a second component denoted G representing a green component, and a third component denoted B representing a blue component. However, the acquired image could use other colorimetric spaces.

As we describe below in relation to FIG. 6, implementation of step 51 makes it possible to determine a geometric distortion model of the document 1 with respect to its reference model. Following the implementation of step 51 on the acquired image, the position in the acquired image of each subpart of the document 1 on which a mark may be applied is known. In addition, an apparent colour value is associated with each of said subparts, each subpart being able to be associated with a different apparent colour, but issuing from the same first predetermined colour value in the reference model of the document 1. In theory, three pixels of the acquired image belonging to one or more subparts of the document 1 on which a mark may be applied are sufficient to determine the coefficients $M_{ij}$ of the affine matrix M. However, determining the matrix M from three pixels would risk giving very noisy matrix coefficients.

In one embodiment, the analysis module 21 uses a number of pixels greater than three to determine the coefficients $M_{ij}$ of the affine matrix M. Each pixel used corresponds to a subpart of the document 1 on which a mark may be applied.

In one embodiment, the analysis module 21 uses a set of pixels, referred to as a set of adjacent pixels, comprising at least one pixel of each subpart of the document 1 on which a mark may be applied to determine the coefficients $M_{ij}$ of the affine matrix M. The same affine matrix M is therefore used by the analysis module 21 to determine whether an apparent colour determined for a subpart is aberrant, whatever the subpart of the document 1.

In one embodiment, the affine matrix M is determined by the analysis module 21 for each subpart of the document 1 on which a mark may be applied. In this embodiment, the analysis module 21 uses a set of pixels, referred to as a set of adjacent pixels, issuing from adjacent subparts of the subpart for which it is wished to determine whether the apparent colour value is aberrant. For example, the analysis module 21 uses the four subparts closest to the subpart for which it is wished to determine whether the apparent colour value is aberrant.

In one embodiment the affine matrix M is determined from pixels of the set of adjacent pixels by a least squares minimisation method.

In one embodiment, the affine matrix M is determined from pixels of the set of adjacent pixels by a method of the RANSAC ("RANdom Sample Consensus") type.

In order to determine whether the apparent colour value of a subpart is aberrant, the analysis module 21 applies the matrix M to the coordinates (x, y) of at least one pixel of the acquired image corresponding to said subpart. In this way the analysis module 21 obtains a theoretical colour value for said subpart. If a difference between the apparent colour value and the theoretical colour value is above a predetermined threshold, the apparent colour value is considered to be aberrant by the analysis module 21 and replaced by the theoretical colour value.

In one embodiment, the method described in relation to FIG. 5 comprises an intermediate step 54, between step 51 and step 56. When the method described in relation to FIG. 5 comprises step 53, step 54 follows step 53.

During step 54, the analysis module 21 applies a correction in the form of a normalisation to the pixels of the acquired image corresponding to each subpart of the document 1 on which a mark can be applied according to the apparent colour value obtained for said subpart. In one embodiment, the normalisation consists of applying a normalisation factor dependent on the apparent colour value associated with a subpart to each pixel component of said subpart. In one embodiment, the apparent colour value is represented by a vector of three components ($R_{CA}$, $G_{CA}$, $B_{CA}$) in the RGB colorimetric space, and the acquired image is an RGB image.

In one embodiment, during normalisation, each component of each pixel of a subpart is standardised with respect to the component $R_{CA}$ (corresponding to the red component) of the apparent colour value associated with said subpart. This type of normalisation is a balance of whites applied in a particular case where the first predetermined colour value is a white, that is to say a colour value having its three components approximately equal in the example of the RGB colorimetric space. Thus the red component of each pixel of a subpart is multiplied by a normalisation coefficient $\alpha_R=1$, the green component of each pixel of a subpart is multiplied by a normalisation coefficient $$\alpha_G = \frac{R_{CA}}{G_{CA}},$$

and the blue component of each pixel of a subpart is multiplied by a normalisation coefficient $$\alpha_B = \frac{R_{CA}}{B_{CA}}.$$

However in other embodiments, each component of each pixel of a subpart could be normalised with respect to another component (or a plurality of other components) of the apparent colour value. For example in another embodiment adapted when the first predetermined colour value is a colour value corresponding to a white, $$\alpha_R = \frac{X}{R_{CA}}, \alpha_G = \frac{X}{G_{CA}} \text{ and } \alpha_B = \frac{X}{B_{CA}}$$

where $X = (R_{CA} + G_{CA} + B_{CA})/3$.

Knowing that a component value is included in a limited range of values (for example between 0 and 255), known methods make it possible to ensure that, after normalisation, each component remains in this range of values. Following step 54, the pixels of the acquired image corresponding to said parts of the document 1 on which marks may be applied are pixels corrected by normalisation.

In one embodiment, the method described in relation to FIG. 5 comprises an intermediate step 55 between step 51 and step 56. When the method is described in relation to FIG. 5 comprises steps 52, 53 and 54, step 55 follows steps 53 and 54. The embodiment of step 55 is suited to the case where each subpart of the document 1 on which a mark may be applied is a box delimited by a contour. The position in the acquired image of the pixels corresponding to the contour of each box of the document 1 is known by virtue of the distortion model determined during step 51 and the reference model of the document 1. Step 55 is particularly advantageous when the colorimetric distortions have been caused, at least partly, by colorimetric drifts during a printing of the document 1.

One objective of step 55 is to correct colorimetric distortions with respect to colour values of the pixels corresponding to the contour of a box. Collecting these colorimetric distortions may make it possible, for example, to better identify the boxes in the document 1. This can then be used in an iterative process where steps 51, 53, 54 and 55 are iterated several times.

During step 55, for each box on the document 1, the analysis module 21 determines a colour value, referred to as the contour colour value, representing colour values of the pixels of the contour of said box. In one embodiment, the colour value of a contour is the colour value appearing most often among the pixels of the acquired image corresponding to the contour. The colour value appearing most often in a set of pixels can be obtained by establishing a histogram with K dimensions of the colour values of the pixels of said set. Each dimension of the histogram with K dimensions represents a pixel component. In the case of an image in the RGB colour space, each pixel has three components. The histogram is therefore a three-dimensional histogram. The colour value appearing most often among the pixels in the set of pixels appears in the form of a peak in the histogram higher than any other peak of the histogram.

Following the determination of the contour colour value, the analysis module 21 corrects the colour value of each pixel of said contour and/or of each pixel situated inside the contour using the contour colour value and a colour value of the pixels of the contour given by the reference of the document 1.

Figure 7:
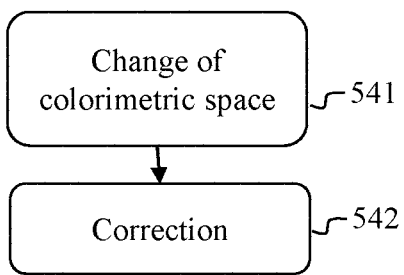
FIG. 7 illustrates schematically a correction method based on colour values of a contour of a box.

To do this, the analysis module 21 uses a method described in relation to FIG. 7.

FIG. 7 illustrates schematically a correction method based on colour values of a contour of a box.

In a step 541, the analysis module 21 modifies the colour space in which target pixels are represented. In the case of step 55, the target pixels correspond to the contour of the box and/or are situated inside the contour. One objective of step 541 is to represent the target pixels in a colorimetric space in which a hue of a pixel is represented in a minimum of components. For example, the target pixels, initially represented in the RGB colorimetric space, are represented in the HSV (hue, saturation and value) colorimetric space. In the HSV colorimetric space, a pixel is represented by three components: a first component denoted H, representing the hue of the pixel, a second component, denoted S, representing an intensity of the pixel, and a third component, denoted V, representing a brightness of the pixel. The component H, generally represented by a circular region, concentrates most of the pixel colour information. Consequently it is possible to act only on the hue component H to correct a colour of a pixel. During step 541, each target pixel is transformed so as to be represented in the HSV space.

In a step 542, each target pixel is corrected. To do this, the analysis module uses a colour value $P_r$ representing the colour values of the target pixels and a colour value $P_m$ of the target pixels given by the reference model of the document 1. In the context of step 55, the colour value $P_r$ is the contour colour value of the box and the colour value $P_m$ is the colour value of the pixels of the contour given by the reference model of the document 1. The colour values $P_r$ and $P_m$ are also transformed so as to be represented in the HSV space. Thus the components of the colour value $P_r$ in the HSV space are denoted $(H_r, S_r, V_r)$, the components of the colour value $P_m$ in the HSV space are denoted $(H_m, S_m, V_m)$ and the components of a target pixel in the HSV space are denoted $(h,s,v)$.

During step 542, each hue component h of a target pixel is transformed into a corrected hue component $h_{cor}$ in the following manner:

$$h=h-H_r+H_m$$

After the correction of the hue component, each target pixel thus corrected is retransformed so as once again to be represented in the RGB colorimetric spacer In one embodiment, a user chooses to apply the correction described in relation to FIG. 7 to the pixels corresponding to the contour, to the pixels situated inside the contour, or to the pixels corresponding to the contour and to the pixels situated inside the contour, for example by configuring the system 2.

In one embodiment, steps 50, 51, 53, 54 and 55 are implemented without step 56. In this case, the method described in relation to FIG. 5 is a method of at least local correction of the acquired image.

In one embodiment of the method allowing determining that a mark has been applied to at least one subpart of a document comprising steps 50, 51 and 53 to 56 and of the correction method comprising steps 50, 51 and 53 to 55 comprise a step 52 following step 51. During step 52, the analysis module 21 applies a correction to the pixels of each subpart dependent on the apparent colour obtained. The correction used during step 52 aims to compensate for a difference between the estimated apparent colour value and the first predetermined colour value.

During step 52, for each subpart of the document 1, the analysis module 21 determines a colour value representing the colour values of the pixels of said subpart in the acquired image. In one embodiment, the colour value representing the colour values of the pixels of said subpart is the colour value appearing most often among the pixels of the subpart. As in step 55, the colour value appearing most often among the pixels of the subpart is obtained from a histogram with K dimensions of the colour values of the pixels of said subpart. Following the determination of the colour value representing the colour values of the pixels of said subpart, the analysis module 21 corrects the colour value of each pixel of said subpart using the colour value representing the colour values of the pixels of said subpart and the apparent colour value. To do this, the analysis module 21 uses the method described in relation to FIG. 7. In the context of step 52, the target pixels are the pixels of said subpart, the colour value $P_r$ is the colour value representing the colour values of the pixels of said subpart and the colour value $P_m$ is the apparent colour value.

Steps 52 and 54 can be combined in order to form a single correction step, normalisation being considered to be a correction.

FIG. 6 illustrates schematically a method for determining an apparent colour value of pixels corresponding to a subpart of an object on which a mark may be applied.

The method described in relation to FIG. 6 is used during step 51.

In a step 511, the analysis module 21 estimates a geometric distortion model of the document 1 in the acquired image with respect to the reference model of document 1. To do this it applies a method of estimating a geometric distortion model of an object described in the patent application FR 1459742 or the method described in the patent FR 2952218. It should be noted that, in one embodiment, step 511 is implemented only once, whatever the number of subparts on which a mark may be applied included in the document 1.

Following step 511, the analysis module 21 performs steps 512, 513 and 514. When the document to be processed comprises more than one subpart on which a mark can be applied, steps 512, 513 and 514 are repeated for each subpart. Steps 512, 513 and 514 are explained hereinafter for a subpart of the document 1 on which a mark may be applied, but are applied in the same way to each subpart of the document 1 on which a mark may be applied.

During step 512, from the geometric distortion model and from the reference model of the object, the analysis module 21 determines a position in the acquired image of the subpart on which a mark may be applied during processing. To do this, each pixel of said subpart is projected from a position given by the reference model of the document 1 to a position in the acquired image using the geometric distortion model.

When it is certain that no mark has been applied to the subpart during processing, it is possible to determine the apparent colour value of the pixels of said subpart by observing pixels of the acquired image situated inside said subpart, for example inside a box. However, by definition, each subpart analysed by the method described in relation to FIG. 6 is a subpart on which a mark has been able to be applied. It is therefore not possible to rely on colours of pixels observed in the subpart during processing in order to determine the apparent colour value of said subpart. The analysis module 21 will therefore rely on other zones of the document 1 which, in the reference model of the document 1, are associated with a second predetermined colour value, a difference $\Delta$ ($\Delta \geq 0$) thereof with respect to the colour value of said subpart (i.e. a difference $\Delta$ with respect to the first predetermined colour value) is known in order to determine the apparent colour value of said subpart, these zones of the document 1 not being intended to receive a mark. Hereinafter a zone of the document 1 not intended to receive a mark and associated with a second predetermined colour is referred to as a blank zone.

During step 513, the analysis module 21 determines, from the geometric distortion model and from the reference model of the document 1, a zone of the acquired image, referred to as the reference zone, situated in a predetermined vicinity of the subpart in the course of processing. Each pixel of the reference zone issues from a projection of a blank zone in the acquired image, the blank zone being associated, in the reference model, with a second predetermined colour value where the difference $\Delta$ thereof with respect to the first predetermined colour value is known. Since the colorimetric distortions may be unequal in a document, the predetermined vicinity is chosen close to the subpart. Thus, if a subpart is affected by a colorimetric distortion, it is very probable that the reference zone will be affected by the same colorimetric distortion. For example, the reference zone is a set of related pixels of the acquired image, not intersecting any subpart of the document 1, but touching the said part being processed. The reference zone is for example square, rectangular, circular or of any shape. If for example the subpart being processed is a box, the set of pixels corresponding to the reference zone touches the contour of the box but the contour and the reference zone have no pixel in common.

In a step 514, the analysis module 21 determines an apparent colour value of the pixels of the subpart, corresponding to the first predetermined colour value, from a colour value of at least one pixel of the reference zone.

In one embodiment, when the first and second predetermined values are equal (the difference $\Delta=0$), the apparent colour value is a colour value of a pixel of the reference zone, or a average of the values of the pixels of the reference zone.

In one embodiment, when the first and second predetermined values are equal (the difference $\Delta=0$), the apparent colour value is the colour value appearing most often among the pixels of the reference zone. The colour value appearing most often among the pixels of the reference zone can be determined by means of a histogram with K dimensions as described in relation to step 55.

In one embodiment, when the first and second predetermined values are different (the difference $\Delta \neq 0$), the apparent colour value is a sum of the colour value of a pixel of the reference zone and the difference $\Delta$, or a sum of the average of the values of the pixels of the reference zone and the difference $\Delta$.

In one embodiment, when the first and second predetermined values are different (the difference $\Delta \neq 0$), the apparent colour value is a sum of the colour value appearing most often among the pixels of the reference zone and the difference $\Delta$.

The invention claimed is:

1. A method for determining an apparent colour value of pixels corresponding to a subpart of an object represented in an image, referred to as the acquired image, wherein the method comprises:
   estimating, by a processor, a geometric distortion model of said object in the acquired image compared with a reference model of the object, the object in the acquired image being a distorted version of the object in the reference model, the geometric distortion model allowing passing from the object in the acquired image to the object in the reference model and conversely;
   from the geometric distortion model and the reference model of the object, determining, by the processor, a position of the subpart in the acquired image, called acquired subpart, from a position of the same subpart in the reference model, called model subpart, and determining a zone of the acquired image, referred to as the reference zone, situated in a predetermined vicinity of the acquired subpart, from the same zone in the reference model, referred to as a blank zone, the blank zone being associated with a predetermined colour value in the reference model of the object; and
   determining, by the processor, an apparent colour value of the pixels of the acquired subpart, from a colour value of at least one pixel of the reference zone.

2. A method for determining that a mark has been applied to a subpart of a document, said document comprising at least one subpart on which a mark can be applied, an image representing the document, referred to as the acquired image, having been acquired by an image acquisition device, wherein the method comprises:
   for each subpart of the document on which a mark can be applied, determining an apparent colour value of the pixels of the acquired image corresponding to the subpart by applying the method according to claim 1 to the subpart, the object being the document; and
   deciding, for each subpart of the document on which a mark can be applied, that a mark has been applied on said subpart when a proportion of the pixels corresponding to the subpart in the acquired image having a colour value, referred to as the pixel colour value, close to the apparent colour value, is below a first predetermined threshold, a pixel colour value being close to the apparent colour value when a difference between said pixel colour value and the apparent colour value is less than a predetermined difference.

3. The method according to claim 2, wherein the method further comprises applying a correction to the pixels of the acquired image corresponding to each subpart of the document on which a mark can be applied according to the apparent colour value obtained for said subpart, each pixel on which a correction is applied becoming a corrected pixel, each pixel taken into account for determining whether the proportion of pixels corresponding to the subpart having a pixel colour value close to the apparent colour value is below the first predetermined threshold being a corrected pixel.

4. The method according to claim 3, wherein the correction applied to the pixels of the acquired image corresponding to a subpart of the document on which a mark can be applied comprises applying a different normalisation factor to each component of each of said pixels, each weighting factor being calculated from the apparent colour value associated with said subpart.

5. The method according to claim 2, wherein the method further comprises filtering among the apparent colour values determined for each subpart of the document on which a mark can be applied, aberrant colour values, an apparent colour value of a first subpart of a document being considered to be aberrant when a difference between the apparent colour value and a colour value, referred to as the vicinity colour value, representing apparent colour values of second subparts, adjacent to the first subpart, is above a second predetermined threshold, a second subpart being adjacent to a first subpart when a distance between the first subpart and the second subpart is less than a predetermined distance, the apparent colour value associated with a subpart being replaced by the vicinity colour value when the apparent value is an aberrant colour value.

6. The method according to claim 2, wherein each subpart of the document is a box delimited by a contour and in that the method further comprises, for each box on the document:
   determining, from the distortion model and the reference model of the document, a position of each pixel corresponding to the contour of the box;
   determining a colour value, referred to as the contour colour value, representing colour values of pixels of said contour; and
   correcting the colour value of each pixel of said contour and/or of each pixel situated inside said contour using the contour colour value and a contour pixel colour value given by the reference model of the document.

7. The method according to claim 6, wherein, when a pixel of said contour or a pixel situated inside said contour is corrected, the pixel is transformed so as to represent it in a colorimetric space in which each pixel is associated with components comprising a hue component, the correction consisting of modifying the hue component using a hue component issuing from the contour colour value and a hue component issuing from the contour pixel colour value given by the reference model of the document.

8. A method for correcting an image, referred to as the acquired image, of a document, said document comprising at least one subpart on which a mark can be applied, wherein the method:
   for each subpart of the document on which a mark can be applied, determining an apparent colour value of the pixels of the acquired image corresponding to the subpart by applying the method according to claim 1 to the subpart, the object being the document; and
   applying a correction to the pixels of the acquired image corresponding to each subpart of the document according to the apparent colour value obtained for said subpart.

9. The method according to claim 8, wherein, the correction applied to the pixels of the acquired image corresponding to a subpart of the document comprises applying a different normalisation factor to each component of each of said pixels, each weighting factor being calculated from the apparent colour value associated with said subpart.

10. The method according to claim 8, wherein the method further comprises filtering among the apparent colour values determined for each subpart of the document on which a mark can be applied, aberrant colour values, an apparent colour value of a first subpart being considered to be aberrant when a difference between the apparent colour value and a colour value, referred to as the vicinity colour value, representing apparent colour values of second subparts adjacent to the first subpart, is above a predetermined threshold, a second subpart being adjacent to a first subpart when a distance between the first subpart and the second subpart is less than a predetermined distance, the apparent colour value associated with a subpart being replaced by the vicinity colour value when the apparent colour value is an aberrant colour value.

11. The method according to claim 8, wherein each subpart of the document is a box delimited by a contour and the in that method further comprises, for each box on the document:
  determining, from the distortion model and the reference model of the document, a position of each pixel corresponding to the contour of the box;
  determining a colour value, referred as the contour colour value, representing colour values of pixels of said contour; and
  correcting the colour value of each pixel of said contour and/or of each pixel situated inside said contour using the contour colour value and a contour pixel colour value given by the reference model of the document.

12. The method according to claim 11, wherein, when a pixel of said contour or a pixel situated inside said contour is corrected, the pixel is transformed so as to represent it in a colorimetric space in which each pixel is associated with components comprising a hue component, the correction consisting of modifying the hue component using a hue component issuing from the contour colour value and a hue component issuing from the contour pixel colour value given by the reference model of the document.

13. A device for determining an apparent colour value of pixels corresponding to a subpart of an object represented in an image, referred to as the acquired image, wherein the device comprises electronic circuitry adapted for:
  estimating a geometric distortion model of said object in the acquired image compared with a reference model of the object, the object in the acquired image being a distorted version of the object in the reference model, the geometric distortion model allowing passing from the object in the acquired image to the object in the reference model and conversely;
  from the geometric distortion model and the reference model of the object, determining a position of the subpart in the acquired image, called acquired subpart, from a position of the same subpart in the reference model, called model subpart, and determining a zone of the acquired image, referred to as the reference zone, situated in a predetermined vicinity of the acquired subpart, from the same zone in the reference model, referred to as a blank zone, of the reference model of the object in the acquired image, the blank zone being associated with a predetermined colour value in the reference model of the object; and
  determining an apparent colour value of the pixels of the subpart, from a colour value of at least one pixel of the reference zone.

14. An image acquisition system comprising a device according to claim 13.

15. A computer program product that comprises non-transitory computer readable medium embodying a program comprising instructions for the implementation, by a device, of the method according to claim 1, when said program is executed by a processor of said device.

16. A storage medium that stores a computer program containing instructions for the implementation, by a device, of the method according to claim 1, when said program is executed by a processor of said device.

17. A device for determining that a mark has been applied to a subpart of a document, said document comprising at least one subpart on which a mark can be applied, an image representing the document, referred to as the acquired image, having been acquired by an image acquisition device, wherein the device comprises electronic circuitry adapted for:
  for each subpart of the document on which a mark can be applied, determining an apparent colour value of the pixels of acquired image corresponding to the subpart by applying to the subpart a method comprising:
    estimating a geometric distortion model of said document in the acquired image compared with a reference model of the document, the object in the acquired image being a distorted version of the object in the reference model, the geometric distortion model allowing passing from the object in the acquired image to the object in the reference model and conversely;
    from the geometric distortion model and the reference model of the document, determining a position of the subpart in the acquired image, called acquired subpart, from a position of the same subpart in the reference model, called model subpart, and determining a zone of the acquired image, referred to as the reference zone, situated in a predetermined vicinity of the acquired subpart, from the same zone in the reference model, referred to as a blank zone, of the reference model of the object in the acquired image, the blank zone being associated with a predetermined colour value in the reference model of the object; and
    determining an apparent colour value of the pixels of the subpart, from a colour value of at least one pixel of the reference zone; and
  deciding, for each subpart of the document on which a mark can be applied, that a mark has been applied on said subpart when a proportion of the pixels corresponding to the subpart having a colour value, referred to as the pixel colour value, close to the apparent colour value, is below a first predetermined threshold, a pixel colour value being close to the apparent colour value when a difference between said pixel colour value and the apparent colour value is less than a predetermined difference.

18. A device comprising circuitry for implementing the method according to claim 8.

19. A non-transitory storage medium that stores a computer program containing instructions for the implementation, by a device, of the method according to claim 2, when said program is executed by a processor of said device.

20. A non-transitory storage medium that stores a computer program containing instructions for the implementation, by a device, of the method according to claim 8, when said program is executed by a processor of said device.

* * * * *